United States Patent
Ihara

(10) Patent No.: US 11,383,983 B2
(45) Date of Patent: Jul. 12, 2022

(54) NANOCARBON SEPARATION DEVICE, NANOCARBON SEPARATION METHOD, NANOCARBON RECOVERY METHOD

(71) Applicant: NEC CORPORATION, Tokyo (JP)

(72) Inventor: Kazuki Ihara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 285 days.

(21) Appl. No.: 16/754,048

(22) PCT Filed: Oct. 10, 2017

(86) PCT No.: PCT/JP2017/036717
§ 371 (c)(1),
(2) Date: Apr. 6, 2020

(87) PCT Pub. No.: WO2019/073530
PCT Pub. Date: Apr. 18, 2019

(65) Prior Publication Data
US 2020/0325023 A1    Oct. 15, 2020

(51) Int. Cl.
*C01B 32/172*    (2017.01)
*B01D 57/02*    (2006.01)
*B01J 20/28*    (2006.01)
*B82Y 40/00*    (2011.01)

(52) U.S. Cl.
CPC ............ *C01B 32/172* (2017.08); *B01D 57/02* (2013.01); *B01J 20/28045* (2013.01); *B82Y 40/00* (2013.01)

(58) Field of Classification Search
CPC ... C01B 32/172; C01B 32/156; C01B 32/194; C01B 32/15; B01D 57/02; B01J 20/28045; B82Y 40/00
See application file for complete search history.

(56) References Cited

U.S. PATENT DOCUMENTS 7,867,468 B1 *    1/2011    Haddon ............... B82Y 40/00
                                                      977/720
2011/0308968 A1 *  12/2011    Howard ................ C25B 1/00
                                                      205/768

FOREIGN PATENT DOCUMENTS

| JP | 2008-055375 A | 3/2008 |
| JP | 2012-036041 A1 | 2/2012 |
| JP | 5541283 B2 | 7/2014 |
| JP | 5717233 B2 | 5/2015 |
| JP | 2017-001919 A | 1/2017 |
| WO | 2008/143281 A1 | 11/2008 |
| WO | 2010/150808 A1 | 12/2010 |

OTHER PUBLICATIONS

Harrington, et al., Sponge-like electrophoresis media: Mechanically strong materials compatible with organic solvents, polymer solutions and two-dimensional electrophoresis, Electropohoresis 1994; 15: 187-194 (Year: 1994).*
International Search Report for PCT/JP2017/036717 dated Nov. 28, 2017 (PCT/ISA210).

* cited by examiner

*Primary Examiner* — Daniel C. McCracken
(74) *Attorney, Agent, or Firm* — Sughrue Mion, PLLC

(57) ABSTRACT

A nanocarbon separation device of the present invention includes a separation tank which is configured to accommodate a dispersion liquid including a nanocarbon, a first electrode that is provided at an upper part in the separation tank, a second electrode that is provided at a lower part in the separation tank, and a porous structure that is provided between the first electrode and the second electrode in the separation tank.

7 Claims, 8 Drawing Sheets

NANOCARBON SEPARATION DEVICE, NANOCARBON SEPARATION METHOD, NANOCARBON RECOVERY METHOD

CROSS REFERENCE TO RELATED APPLICATIONS

This application is a National Stage of International Application No. PCT/JP2017/036717 filed Oct. 10, 2017.

TECHNICAL FIELD

The present invention relates to a nanocarbon separation device, a nanocarbon separation method and a nanocarbon recovery method.

BACKGROUND ART

Single-walled carbon nanotubes have high electron mobility and are expected to be applied to various fields due to their mechanical properties, electrical properties, chemical properties, and the like. Since single-walled carbon nanotubes are synthesized as a mixture of materials having different properties, including semiconducting and metallic properties, at a ratio of 2:1, it is necessary to perform separation for each property with high purity and rapidly for industrial applications.

As a method of separating a mixture of single-walled carbon nanotubes, for example, a nanocarbon material separation method including a step of introducing a dispersion liquid including nanocarbon materials dispersed in nanocarbon micelle groups having a plurality of different charges and a holding solution having a specific gravity different from that of the nanocarbon materials into an electrophoresis tank by laminating the solutions and arranging them in a predetermined direction, and a step of separating the nanocarbon micelle groups into two or more nanocarbon micelle groups by applying a direct current voltage in a serial direction to the introduced, arranged and laminated dispersion liquid and holding solution is known (for example, refer to Patent Document 1). In addition, a single-walled carbon nanotube separation method including a step in which a direct current voltage is applied to a single-walled carbon nanotube-containing micelle dispersion liquid in which single-walled carbon nanotubes are dispersed in a non-ionic surfactant solution in a vertically installed separation tank, and the mixture is separated into at least two layers including a single-walled carbon nanotube-containing micelle dispersion liquid layer in which metallic single-walled carbon nanotubes in which micelles have a positive charge as a whole are concentrated and a semiconducting single-walled carbon nanotube-containing micelle dispersion liquid layer in which micelles have a very weak charge as a whole, and in which a direct current voltage is applied to a negative electrode installed at an upper part and a positive electrode installed at a lower part in the separation tank, the direction of an electric field is upward and parallel to the direction of gravity is known (for example, refer to Patent Document 2).

PRIOR ART DOCUMENTS

Patent Documents

[Patent Document 1] Japanese Patent No. 5541283
[Patent Document 2] Japanese Patent No. 5717233

SUMMARY OF THE INVENTION

Problem to be Solved by the Invention

However, the separation methods described in Patent Documents 1 and 2 have problems that, when the diameter of the separation tank is increased in order to separate a large amount of a mixture of single-walled carbon nanotubes at a time, disturbance occurs due to convection of the single-walled carbon nanotube-containing dispersion liquid and the like in the separation tank according to the increase in the diameter, and the separation takes time.

An object of the present invention is to provide a nanocarbon separation device, a nanocarbon separation method and a nanocarbon recovery method through which it is possible to shorten a time required for the separation in separation of a mixture of nanocarbons.

Means for Solving the Problem

A nanocarbon separation device of the present invention includes a separation tank which is configured to accommodate a dispersion liquid including a nanocarbon, a first electrode that is provided at an upper part in the separation tank, a second electrode that is provided at a lower part in the separation tank, and a porous structure that is provided between the first electrode and the second electrode in the separation tank.

A nanocarbon separation method of the present invention is a nanocarbon separation method using the nanocarbon separation device of the present invention, which includes a step of injecting a dispersion liquid including a nanocarbon into the separation tank, and a step of separating metallic nanocarbons and semiconducting nanocarbons included in the dispersion liquid by applying a direct current voltage to the first electrode and the second electrode.

A nanocarbon recovery method of the present invention using the nanocarbon separation device of the present invention includes, after the nanocarbon separation device completes a separation operation, dividing the porous structure into a region A including a large amount of metallic nanocarbons and a region B including a large amount of semiconducting nanocarbons, recovering the metallic nanocarbons from the region A, and recovering the semiconducting nanocarbons from the region B.

Effect of the Invention

According to the present invention, it is possible to shorten a time required for the separation in separation of a mixture of nanocarbons.

EMBODIMENTS FOR CARRYING OUT THE INVENTION

A nanocarbon separation device, a nanocarbon separation method and a nanocarbon recovery method according to example embodiments of the present invention will be described.

Here, the present example embodiment is described in detail in order for better understanding of the spirit of the present invention, and does not limit the present invention unless otherwise specified.

[First Example Embodiment] Porous Structure: Sponge (Nanocarbon Separation Device)

Figure 1:
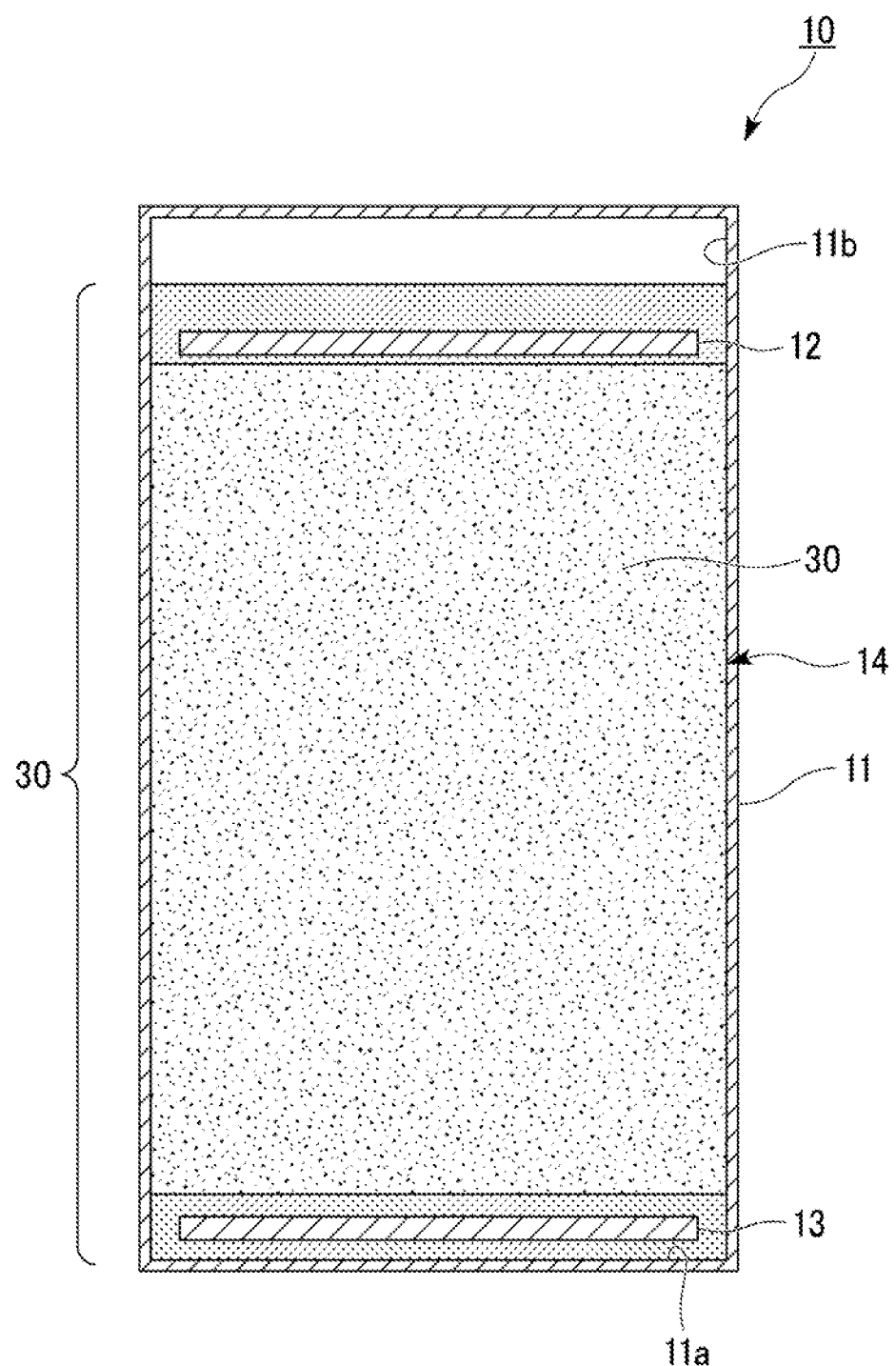
FIG. 1 is a schematic view showing a nanocarbon separation device of a first example embodiment.

FIG. 1 is a schematic view showing a nanocarbon separation device of the present example embodiment.

A nanocarbon separation device 10 of the present example embodiment includes a separation tank (electrophoresis tank) 11, a first electrode 12 provided at an upper part in the separation tank 11, a second electrode 13 provided at a lower part in the separation tank 11, and a porous structure 14 that is provided between the first electrode 12 and the second electrode 13 in the separation tank 11 and extends in the height direction of the separation tank 11.

In the nanocarbon separation device 10 of the present example embodiment, the porous structure 14 is formed of a sponge which is a porous soft object having numerous fine holes therein.

The first electrode 12 is disposed at an upper part in the height direction (in the separation tank 11, in a region higher than half of the height thereof, which is a region opposite to an inner bottom surface 11a of the separation tank 11) in the separation tank 11.

The second electrode 13 is disposed at a lower part in the height direction (in the separation tank 11, a region lower than half of the height, which is a region on the side of the inner bottom surface 11a of the separation tank 11) in the separation tank 11.

In the nanocarbon separation device 10 of the present example embodiment, the first electrode 12 is a negative electrode, and the second electrode 13 is a positive electrode. In this case, when a direct current (DC) voltage is applied to the first electrode 12 and the second electrode 13, the direction of the electric field is directed from a bottom of the separation tank 11 upward.

The separation tank 11 has a space in which a nanocarbon-containing dispersion liquid (hereinafter referred to as a "nanocarbon dispersion liquid") 30 can be accommodated. In the separation tank 11, nanocarbons dispersed in the accommodated nanocarbon dispersion liquid 30 can be separated through electrophoresis. The shape and size of the separation tank 11 are not particularly limited as long as the separation tank 11 can accommodate the nanocarbon dispersion liquid 30.

The separation tank 11 is a container having a hollow tube. The lower end of the separation tank 11 is closed and forms the bottom of the container.

The material of the separation tank 11 is not particularly limited as long as it is stable with respect to the nanocarbon dispersion liquid 30 and is an insulating material. Examples of materials of the separation tank 11 include glass, quartz, and an acrylic resin.

The first electrode 12 and the second electrode 13 are not particularly limited as long as they can be used for electrophoresis and are stable with respect to the nanocarbon dispersion liquid 30. Examples of the first electrode 12 and the second electrode 13 include a platinum electrode.

The structures of the first electrode 12 and the second electrode 13 are not particularly limited, and in the separation tank 11, are appropriately selected according to the shapes and sizes of regions partitioned by the porous structure 14. The structure of the first electrode 12 is not particularly limited as long as it is disposed at an upper part of the porous structure 14 and is disposed to extend over the entire upper end of the porous structure 14 in the separation tank 11. The structure of the second electrode 13 is not particularly limited as long as it is disposed at a lower part of the porous structure 14 and is disposed to extend over the entire lower end of the porous structure 14 in the separation tank 11. Examples of structures of the first electrode 12 and the second electrode 13 include an annular shape, a disk shape, and a rod shape in a plan view of the separation tank 11. In addition, examples of structures of the first electrode 12 and the second electrode 13 include a porous plate shape in which a plurality of fine pores are uniformly provided.

The sponge forming the porous structure 14 is not particularly limited. The material of the sponge is not particularly limited as long as it is stable with respect to the nanocarbon dispersion liquid 30 and is an insulating material. The sponge is a porous component having numerous fine holes that are continuously connected therein. Examples of sponges include those made of natural sponges and artificial sponges made of a synthetic resin. In addition, regarding the material of the sponge, a porous material that can hold the following solution can be used. Examples of porous materials include urethane; synthetic sponges using a foamed polyethylene, polyethylene, ethylene propylene rubber, chloroprene rubber, natural rubber, a melamine resin or the like; natural sponges produced from marine life represented by *Spongia officinalis*; and pumice. In addition, as an example, a urethane foam sponge for water absorption having a porosity of 98.5% (such an example; TRUSCO sponge for water absorption commercially available from Trusco Nakayama Corporation) can be used. Therefore, the interior of the separation tank 11 is partitioned into a plurality of regions by the porous structure 14 formed of a sponge.

The size (a height, an outer diameter, a volume, etc.) of the porous structure 14 is not particularly limited, and is appropriately adjusted according to the amount of the nanocarbon dispersion liquid 30 held in the porous structure 14.

The porosity (void fraction) in the porous structure 14 may be any porosity as long as nanocarbon micelles can pass therethrough, pores are continuously connected, and a potential gradient is formed between upper and lower electrodes. In the synthetic sponge, the porosity (void fraction) in the porous structure 14 is preferably 80% or more and 99.9% or less and more preferably 90% or more and 99% or less. Here, in the synthetic sponge, when the porosity in the porous structure 14 is 80% or more, pores communicate with each other in the entire area of the porous structure 14, and the porous structure 14 does not restrict movement of metallic nanocarbons and semiconducting nanocarbons contained in the nanocarbon dispersion liquid 30 in separation of the nanocarbon dispersion liquid 30 using the nanocarbon separation device 10. Thereby, metallic nanocarbons and semiconducting nanocarbons contained in the nanocarbon dispersion liquid 30 can be efficiently separated.

The porosity of the porous structure 14 is a ratio of pores of the porous structure 14 to a total volume of the porous structure 14. The porosity of the porous structure 14 is represented by the following Formula (1).

$$a1/A1 \times 100 \quad (1)$$

That is, the porosity of the porous structure 14 is expressed as a percentage as a ratio between a total volume a1 of pores of the porous structure 14 and a total volume A1 of the porous structure 14 including the pores.

Examples of a method of determining the porosity of the porous structure 14 include a method in which an apparent specific gravity d1 of the porous structure 14 including pores and a true specific gravity D1 of the porous structure 14 are obtained, and the porosity of the porous structure 14 is calculated from the specific gravities. In the method, the porosity of the porous structure 14 is calculated based on the following Formula (2).

$$(D1-d1)/D1 \times 100 \quad (2)$$

The size of the pores of the porous structure 14, that is, the inner diameter of the pores, is preferably 40 nm or more, more preferably 100 nm or more, and most preferably more than 200 nm. In addition, the inner diameter of the pores is preferably 1 cm or less, and more preferably 1 mm or less.

When the inner diameter of the pores of the porous structure 14 is 40 nm or more, the porous structure 14 does not restrict movement of metallic nanocarbons and semiconducting nanocarbons contained in the nanocarbon dispersion liquid 30 in separation of the nanocarbon dispersion liquid 30 using the nanocarbon separation device 10. Thereby, metallic nanocarbons and semiconducting nanocarbons contained in the nanocarbon dispersion liquid 30 can be efficiently separated.

Here, the shape of the pores of the porous structure 14 is irregular and examples thereof include a spherical shape and a spheroidal shape. Therefore, the inner diameter of the pores of the porous structure 14 is the diameter of the sphere when the pores are spherical, the long diameter of the spheroid when the pores are spheroidal, and a length of the longest part of the shape when the pores have a shape other than a spherical shape or a spheroidal shape.

Examples of a method of determining the size of the pores of the porous structure 14 include a method in which the porous structure 14 is observed under an optical microscope or a scanning electron microscope, and the size of the pores is actually measured from a microscope image thereof.

The porous structure 14 is preferably transparent, milky white translucent (white with a transparent back), or milky white (non-transparent white with a non-transparent back) in order to easily check a separation state between metallic nanocarbons and semiconducting nanocarbons contained in the nanocarbon dispersion liquid 30. When separation of metallic nanocarbons and semiconducting nanocarbons progresses, the nanocarbon dispersion liquid 30 having a large amount of metallic nanocarbons becomes black, and the nanocarbon dispersion liquid 30 having a large amount of semiconducting nanocarbons becomes blue. Therefore, it is preferable to visually check a separation state between metallic nanocarbons and semiconducting nanocarbons with the color of the porous structure 14 as a background.

The porous structure 14 preferably extends in a region between the first electrode 12 and the second electrode 13 in the separation tank 11 over substantially the entire region in the height direction. In addition, the external form of the porous structure 14 has preferably a shape similar to the shape of the region between the first electrode 12 and the second electrode 13 in the separation tank 11.

The nanocarbon separation device 10 of the present example embodiment may include an injection port (not shown) through which the nanocarbon dispersion liquid 30 is injected into the separation tank 11. The injection port may be provided at an upper part in the height direction (in the separation tank 11, in a region higher than half of the height, a region opposite to the inner bottom surface 11a of the separation tank 11) in the separation tank 11. When the upper end of the separation tank 11 is an opening 11b, the opening 11b may be an injection port through which the nanocarbon dispersion liquid 30 is injected into the separation tank 11.

While a case in which the first electrode 12 is a negative electrode and the second electrode 13 is a positive electrode has been provided as an exemplary example of the nanocarbon separation device 10 of the present example embodiment, the nanocarbon separation device 10 of the present example embodiment is not limited thereto. In the nanocarbon separation device 10 of the present example embodiment, the first electrode 12 may be a positive electrode and the second electrode 13 may be a negative electrode.

According to the nanocarbon separation device 10 of the present example embodiment, when the porous structure 14 that is provided between the first electrode 12 and the second electrode 13 and extends in the height direction of the separation tank 11 is provided, the occurrence of a horizontal flow of the nanocarbon dispersion liquid 30 in the separation tank 11 can be inhibited, for example, in a step of separating metallic nanocarbons and semiconducting nanocarbons contained in the nanocarbon dispersion liquid 30 which is performed in a nanocarbon separation method to be described below. Therefore, metallic nanocarbons and semiconducting nanocarbons can be quickly separated. Accordingly, it is possible to obtain highly pure metallic nanocarbons and semiconducting nanocarbons.

(Nanocarbon Separation Method)

Figure 2:
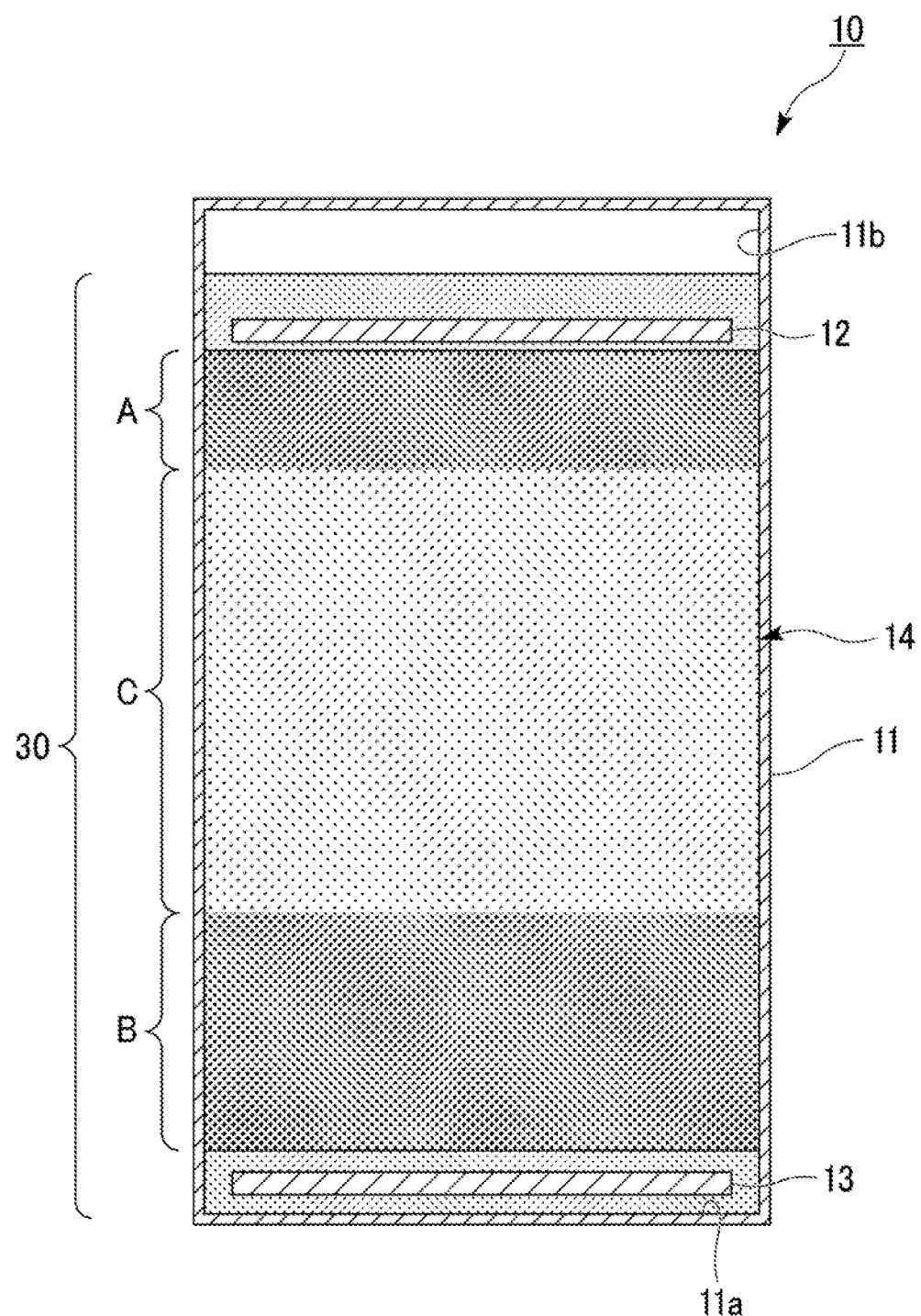
FIG. 2 is a schematic view showing the nanocarbon separation device of the first example embodiment.

A nanocarbon separation method using the nanocarbon separation device 10 will be described and also operations of the nanocarbon separation device 10 will be described with reference to FIG. 1 to FIG. 3.

Figure 3:
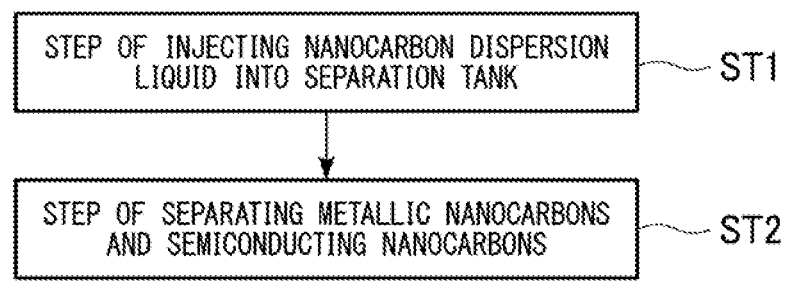
FIG. 3 is a flowchart showing a nanocarbon separation method of the present invention.

FIG. 3 is a flowchart showing a nanocarbon separation method of the present example embodiment.

The nanocarbon separation method of the present example embodiment includes a step of injecting the nanocarbon dispersion liquid 30 into the separation tank 11 (hereinafter referred to as an "injection step") and a step of separating metallic nanocarbons and semiconducting nanocarbons contained in the nanocarbon dispersion liquid 30 by applying a direct current voltage to the first electrode 12 and the second electrode 13 (hereinafter referred to as a "separation step").

In the nanocarbon separation method of the present example embodiment, the nanocarbon refers to a carbon material mainly composed of carbon such as single-walled carbon nanotubes, double-walled carbon nanotubes, multi-walled carbon nanotubes, carbon nanohorns, carbon nanotwists, graphene, fullerene, and the like. In the nanocarbon separation method of the present example embodiment, a case in which semiconducting single-walled carbon nanotubes and metallic single-walled carbon nanotubes are separated from a dispersion liquid in which single-walled carbon nanotubes as nanocarbons are dispersed will be described in detail.

It is known that single-walled carbon nanotubes are divided into a metallic type and a semiconducting type with two different properties according to the diameter of the tube and a winding method. When single-walled carbon nanotubes are synthesized using a conventional production method, a mixture of single-walled carbon nanotubes including metallic single-walled carbon nanotubes having metallic properties and semiconducting single-walled carbon nanotubes having semiconducting properties at a statistical ratio of 1:2 is obtained.

The mixture of single-walled carbon nanotubes is not particularly limited as long as it contains metallic single-walled carbon nanotubes and semiconducting single-walled carbon nanotubes. In addition, the single-walled carbon nanotubes in the present example embodiment may be single-walled carbon nanotubes alone or single-walled carbon nanotubes in which some of carbon atoms are substituted with an arbitrary functional group or single-walled carbon nanotubes that are modified with an arbitrary functional group.

First, a single-walled carbon nanotube dispersion liquid in which a mixture of single-walled carbon nanotubes is dispersed in a dispersion medium together with a surfactant is prepared.

The dispersion medium is not particularly limited as long as it allows the mixture of single-walled carbon nanotubes to be dispersed. Examples of dispersion mediums include water, heavy water, an organic solvent, and an ionic liquid. Among these dispersion mediums, water or heavy water is suitably used because single-walled carbon nanotubes do not deteriorate.

Regarding the surfactant, a non-ionic surfactant, a cationic surfactant, an anionic surfactant and the like are used. A non-ionic surfactant is preferably used in order to prevent ionic impurities such as sodium ions from being mixed into single-walled carbon nanotubes.

Regarding the non-ionic surfactant, a non-ionic surfactant having a non-ionizable hydrophilic moiety and a hydrophobic moiety such as an alkyl chain is used. Examples of such a non-ionic surfactant include a non-ionic surfactant having a polyethylene glycol structure represented by a polyoxyethylene alkyl ether type.

Regarding such a non-ionic surfactant, a polyoxyethylene alkyl ether represented by the following Formula (1) is suitably used.

$$C_nH_{2n}(OCH_2CH_2)_mOH \qquad (1)$$

(here, n=12 to 18, m=20 to 100)

Examples of a polyoxyethylene alkyl ether represented by Formula (1) include polyoxyethylene (23) lauryl ether (product name: Brij L23, commercially available from Sigma-Aldrich), polyoxyethylene (20) cetyl ether (product name: Brij C20, commercially available from Sigma-Aldrich), polyoxyethylene (20) stearyl ether (product name: Brij S20, commercially available from Sigma-Aldrich), polyoxyethylene (20) oleyl ether (product name: Brij O20, commercially available from Sigma-Aldrich), and polyoxyethylene (100) stearyl ether (product name: Brij 5100, commercially available from Sigma-Aldrich).

Regarding the non-ionic surfactant, polyoxyethylene sorbitan monostearate (molecular formula: $C_{64}H_{126}O_{26}$, product name: Tween 60, commercially available from Sigma-Aldrich), polyoxyethylene sorbitan trioleate (molecular formula: $C_{24}H_{44}O_6$, product name: Tween 85, commercially available from Sigma-Aldrich), octylphenol ethoxylate (molecular formula: $C_{14}H_{22}O(C_2H_4O)_n$, n=1 to 10, product name: Triton X-100, commercially available from Sigma-Aldrich), polyoxyethylene (40) isooctyl phenyl ether (molecular formula: $C_8H_{17}C_6H_{40}(CH_2CH_{20})_{40}H$, product name: Triton X-405, commercially available from Sigma-Aldrich), poloxamer (molecular formula: $C_5H_{10}O_2$, product name: Pluronic, commercially available from Sigma-Aldrich), and polyvinyl pyrrolidone (molecular formula: $(C_6H_9NO)_n$, n=5 to 100, commercially available from Sigma-Aldrich) or the like can be used.

The amount of the non-ionic surfactant in the single-walled carbon nanotube dispersion liquid is preferably 0.1 wt % or more and 5 wt % or less and more preferably 0.5 wt % or more and 2 wt % or less.

When the amount of the non-ionic surfactant is 5 wt % or less, the viscosity of the single-walled carbon nanotube dispersion liquid does not become too high, and metallic single-walled carbon nanotubes and semiconducting single-walled carbon nanotubes contained in the single-walled carbon nanotube dispersion liquid can be easily separated through electrophoresis.

The amount of single-walled carbon nanotubes in the single-walled carbon nanotube dispersion liquid is preferably 1 µg/mL or more and 100 µg/mL or less and more preferably 5 µg/mL or more and 40 µg/mL or less.

When the amount of single-walled carbon nanotubes is within the above range, metallic single-walled carbon nanotubes and semiconducting single-walled carbon nanotubes contained in the single-walled carbon nanotube dispersion liquid can be easily separated through electrophoresis.

A method of preparing a single-walled carbon nanotube dispersion liquid is not particularly limited, and a known method is used. For example, a method in which a mixed solution of a dispersion medium containing a single-walled carbon nanotube mixture and a surfactant is subjected to an ultrasonic treatment and the single-walled carbon nanotube mixture is dispersed in the dispersion medium may be an exemplary example. According to this ultrasonic treatment, the aggregated metallic single-walled carbon nanotubes and semiconducting single-walled carbon nanotubes are sufficiently separated, and in the single-walled carbon nanotube dispersion liquid, metallic single-walled carbon nanotubes and semiconducting single-walled carbon nanotubes are uniformly dispersed in the dispersion medium. Thereby, metallic single-walled carbon nanotubes and semiconducting single-walled carbon nanotubes are easily separated through electrophoresis to be described below. Here, metallic single-walled carbon nanotubes and semiconducting single-walled carbon nanotubes that are not dispersed according to an ultrasonic treatment are preferably separated and removed through ultracentrifugation.

Next, in the injection step, the single-walled carbon nanotube dispersion liquid prepared as described above is injected into the separation tank 11.

Thereby, the single-walled carbon nanotube dispersion liquid permeates the porous structure 14 in the separation tank 11.

In addition, when the single-walled carbon nanotube dispersion liquid is injected into the separation tank 11, the first electrode 12 and the second electrode 13 are brought into contact with the single-walled carbon nanotube dispersion liquid. In the present example embodiment, a first electrode 202 and a second electrode 203 are immersed in the single-walled carbon nanotube dispersion liquid. Here, the first electrode 12 and the second electrode 13 need not be in contact with the porous structure 14.

Next, in the separation step, metallic single-walled carbon nanotubes and semiconducting single-walled carbon nanotubes contained in the single-walled carbon nanotube dispersion liquid are separated through electrophoresis.

When a direct current voltage is applied to the first electrode 12 and the second electrode 13 for a predetermined time (for example, 1 hour to 24 hours), an electric field is formed in the separation tank 11. Specifically, the electric field is formed so that the direction of the electric field is directed from a bottom of the separation tank 11 upward. Due to an electrophoretic force generated by the electric field and the charge of single-walled carbon nanotubes, a mixture of single-walled carbon nanotubes contained in the single-walled carbon nanotube dispersion liquid are separated into metallic single-walled carbon nanotubes and semiconducting single-walled carbon nanotubes.

In the single-walled carbon nanotube dispersion liquid containing a non-ionic surfactant, metallic single-walled carbon nanotubes have a positive charge, and semiconducting single-walled carbon nanotubes have a very weak negative charge.

Thus, when a direct current voltage is applied to the first electrode 12 and the second electrode 13, in the mixture of single-walled carbon nanotubes contained in the single-walled carbon nanotube dispersion liquid, metallic single-walled carbon nanotubes move toward the first electrode 12 (negative electrode), and semiconducting single-walled carbon nanotubes move toward the second electrode 13 (positive electrode). As a result, the phase of the single-walled carbon nanotube dispersion liquid is separated into three phases including a dispersion liquid phase having a relatively large amount of metallic single-walled carbon nanotubes (hereinafter referred to as a "dispersion liquid phase A"), a dispersion liquid phase having a relatively large amount of semiconducting single-walled carbon nanotubes (hereinafter referred to as a "dispersion liquid phase B"), and a dispersion liquid phase which is formed between the dispersion liquid phase A and the dispersion liquid phase B and has a relatively small amount of metallic single-walled carbon nanotubes and semiconducting single-walled carbon nanotubes (hereinafter referred to as a "dispersion liquid phase C").

In other words, in a region on the side of the first electrode 12 in the porous structure 14, a region A containing a large amount of metallic single-walled carbon nanotubes, that is, a region containing the dispersion liquid phase A, is formed. In addition, in a region on the side of the second electrode 13 in the porous structure 14, a region B containing a large amount of semiconducting single-walled carbon nanotubes, that is, a region containing the dispersion liquid phase B, is formed.

A direct current voltage applied to the first electrode 12 and the second electrode 13 is not particularly limited, and is appropriately adjusted according to a distance between the first electrode 12 and the second electrode 13, the amount of the mixture of single-walled carbon nanotubes in the single-walled carbon nanotube dispersion liquid, or the like.

When water or heavy water is used as the dispersion medium of the single-walled carbon nanotube dispersion liquid, a direct current voltage applied to the first electrode 12 and the second electrode 13 has any value that is larger than 0 V and equal to and less than 1,000 V.

For example, when a distance between the first electrode 12 and the second electrode 13 (inter-electrode distance) is 30 cm, a direct current voltage applied to the first electrode 12 and the second electrode 13 is preferably 15 V or more and 450 V or less and more preferably 30 V or more and 300 V or less.

When a direct current voltage applied to the first electrode 12 and the second electrode 13 is 15 V or more, a pH gradient of the single-walled carbon nanotube dispersion liquid is formed in the separation tank 11, and it is possible to separate metallic single-walled carbon nanotubes and semiconducting single-walled carbon nanotubes contained in the single-walled carbon nanotube dispersion liquid. On the other hand, when a direct current voltage applied to the first electrode 12 and the second electrode 13 is 450 V or less, the influence of electrolysis of water or heavy water is reduced.

In addition, when a direct current voltage is applied to the first electrode 12 and the second electrode 13, the electric field between the first electrode 12 and the second electrode 13 is preferably 0.5 V/cm or more and 15 V/cm or less and more preferably 1 V/cm or more and 10 V/cm or less.

When the electric field between the first electrode 12 and the second electrode 13 is 0.5 V/cm or more, a pH gradient of the single-walled carbon nanotube dispersion liquid is formed in the separation tank 11, and it is possible to separate metallic single-walled carbon nanotubes and semiconducting single-walled carbon nanotubes contained in the single-walled carbon nanotube dispersion liquid. On the other hand, when the electric field between the first electrode 12 and the second electrode 13 is 15 V/cm or less, the influence of electrolysis of water or heavy water is reduced.

Here, when separation of metallic single-walled carbon nanotubes and semiconducting single-walled carbon nanotubes starts through electrophoresis, the metallic single-walled carbon nanotubes and the semiconducting single-walled carbon nanotubes move in the height direction of the separation tank 11, and also move in a direction perpendicular to the height direction of the separation tank 11. Thereby, a flow occurs in a direction (horizontal direction) perpendicular to the height direction of the separation tank 11 in the single-walled carbon nanotube dispersion liquid. When a horizontal flows occurs in the single-walled carbon nanotube dispersion liquid, a time required for the separation of the phase of the single-walled carbon nanotube dispersion liquid into the dispersion liquid phase A and the dispersion liquid phase B increases. In particular, when the inner diameter of the separation tank 11 increases as the volume of the separation tank 11 increases, a time required for phase separation increases. Therefore, in the present example embodiment, the porous structure 14 formed of a sponge is provided in the separation tank 11, and the interior of the separation tank 11 is partitioned into a plurality of regions. Thereby, in the separation step, when the phase of the single-walled carbon nanotube dispersion liquid is separated in the separation tank 11 through electrophoresis, the occurrence of a horizontal flow in the single-walled carbon nanotube dispersion liquid can be inhibited. As a result, even if the separation tank 11 having a large inner diameter is used, the region A containing the dispersion liquid phase A is quickly formed in a region on the side of the first electrode 12 in the porous structure 14, and the region B containing the dispersion liquid phase B is formed in a region on the side of the second electrode 13 in the porous structure 14, and the phase of the single-walled carbon nanotube dispersion liquid can be separated into the dispersion liquid phase A and the dispersion liquid phase B.

According to the nanocarbon separation method using the nanocarbon separation device 10 of the present example embodiment, when the porous structure 14 formed of a sponge is provided between the first electrode 12 and the second electrode 13, the occurrence of a horizontal flow in the single-walled carbon nanotube dispersion liquid can be inhibited in the separation tank 11. As a result, it is possible to quickly separate metallic single-walled carbon nanotubes and semiconducting single-walled carbon nanotubes.

Accordingly, it is possible to obtain highly pure metallic single-walled carbon nanotubes and semiconducting single-walled carbon nanotubes.

Here, while a case in which the mixture of single-walled carbon nanotubes is separated into metallic single-walled carbon nanotubes and semiconducting single-walled carbon nanotubes has been provided as an exemplary example of the nanocarbon separation method of the present example embodiment, the nanocarbon separation method of the present example embodiment is not limited thereto. In the nanocarbon separation method of the present example embodiment, for example, a single-walled carbon nanotube purifying method in which the mixture is separated into metallic single-walled carbon nanotubes and semiconducting single-walled carbon nanotubes in the separation tank 11, and only single-walled carbon nanotubes having desired properties are then recovered may be performed.

(Nanocarbon Recovery Method)

In the nanocarbon recovery method of the present example embodiment, after the separation operation according to the nanocarbon separation method using the nanocarbon separation device 10 of the present example embodiment is completed, the porous structure 14 is divided into the region A containing a large amount of metallic single-walled carbon nanotubes and the region B containing a large amount of semiconducting single-walled carbon nanotubes, metallic single-walled carbon nanotubes are recovered from the region A, and semiconducting single-walled carbon nanotubes are recovered from the region B.

The recovery method is not particularly limited, and any method in which the dispersion liquid phase A and the dispersion liquid phase B are not mixed by diffusion may be used.

In the nanocarbon recovery method of the present example embodiment, for example, the following two methods are used as the recovery method.

Figure 4:
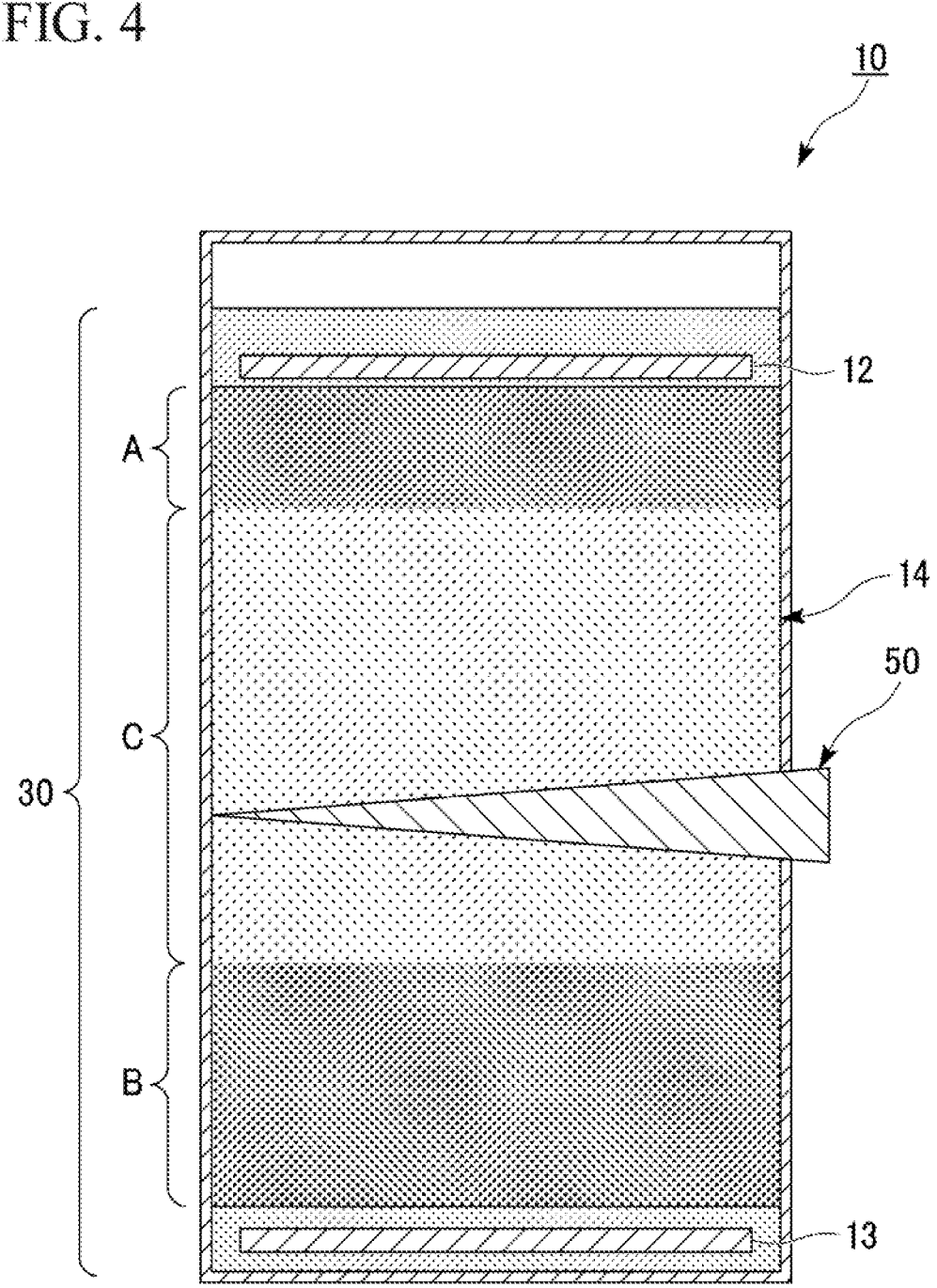
FIG. 4 is a schematic view showing a nanocarbon recovery method in the nanocarbon separation device of the first example embodiment.

Regarding the recovery method, for example, a method using a cutting blade 50 as shown in FIG. 4 may be an exemplary example.

In the recovery method, while a direct current voltage is applied to the first electrode 12 and the second electrode 13, the porous structure 14 is vertically cut with the cutting blade 50 in the height direction, and the porous structure 14 is divided into the region A containing a large amount of metallic single-walled carbon nanotubes and the region B containing a large amount of semiconducting single-walled carbon nanotubes. In addition, at the same time as the division, a partition plate or the like is inserted between the upper region A and the lower region B in the porous structure 14, and the dispersion liquid phase A present in the region A and the dispersion liquid phase B present in the region B are recovered. Here, the cutting blade 50 may be used as a part of the partition plate.

Figure 5:
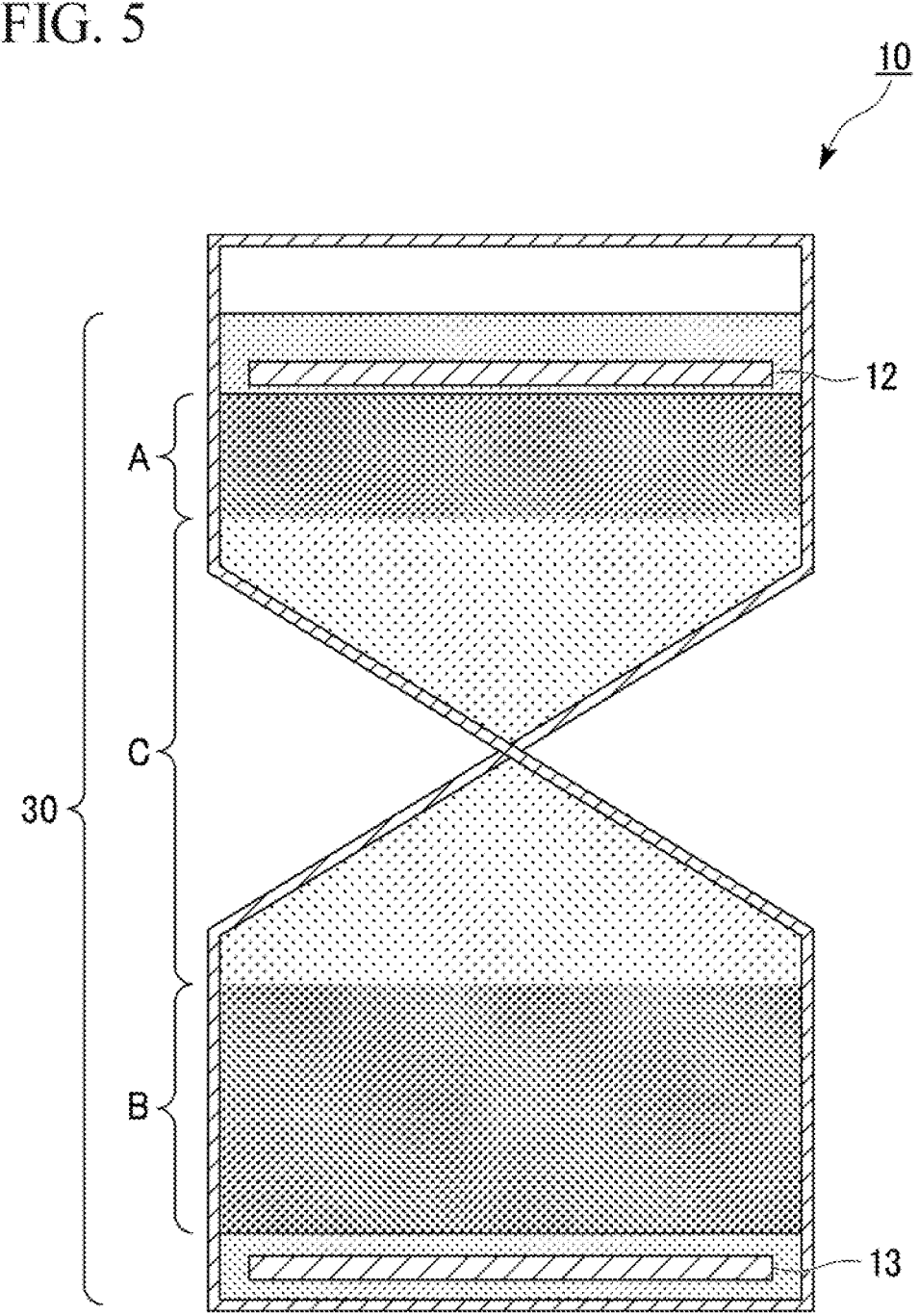
FIG. 5 is a schematic view showing the nanocarbon recovery method in the nanocarbon separation device of the first example embodiment.

In addition, regarding the recovery method, for example, a method of twisting the porous structure 14 together with the separation tank 11 as shown in FIG. 5 may be an exemplary example.

In the recovery method, regarding the separation tank 11, a tank made of a film composed of a resin such as an acrylic resin is used. While a direct current voltage is applied to the first electrode 12 and the second electrode 13, the porous structure 14 is twisted together with the separation tank 11 at the center of the separation tank 11 and the porous structure 14 in the height direction, and the porous structure 14 is divided into the region A containing a large amount of metallic single-walled carbon nanotubes and the region B containing a large amount of semiconducting single-walled carbon nanotubes. Then, the dispersion liquid phase A present in the upper region A in the divided porous structure 14 and the dispersion liquid phase B present in the lower region B in the porous structure 14 are recovered.

The recovered dispersion liquid is accommodated again in the separation tank 11, the operation of separating metallic single-walled carbon nanotubes and semiconducting single-walled carbon nanotubes contained in the single-walled carbon nanotube dispersion liquid through electrophoresis is repeatedly performed in the same manner as described above, and thus it is possible to obtain highly pure metallic single-walled carbon nanotubes and semiconducting single-walled carbon nanotubes.

The separation efficiency of the recovered dispersion liquid can be evaluated through a technique such as microscopic Raman spectroscopy (change in Raman spectrums in a radial breathing mode (RBM) region, and change in a Raman spectrum shape in a Breit-Wigner-Fano (BWF) region), and ultraviolet-visible-near-infrared absorption spectrophotometry (change in peak shape of absorption spectrum). In addition, the separation efficiency of the dispersion liquid can also be evaluated by evaluating electrical properties of single-walled carbon nanotubes. For example, the separation efficiency of the dispersion liquid can be evaluated by producing a field effect transistor and measuring its transistor characteristics.

According to the nanocarbon recovery method of the present example embodiment, after the separation operation according to the nanocarbon separation method of the present example embodiment is completed, metallic single-walled carbon nanotubes can be efficiently recovered from the region A of the porous structure 14, and semiconducting single-walled carbon nanotubes can be efficiently recovered from the region B of the porous structure 14.

[Second Example Embodiment] Aggregate of Plurality of Particle (Nanocarbon Separation Device)

Figure 6:
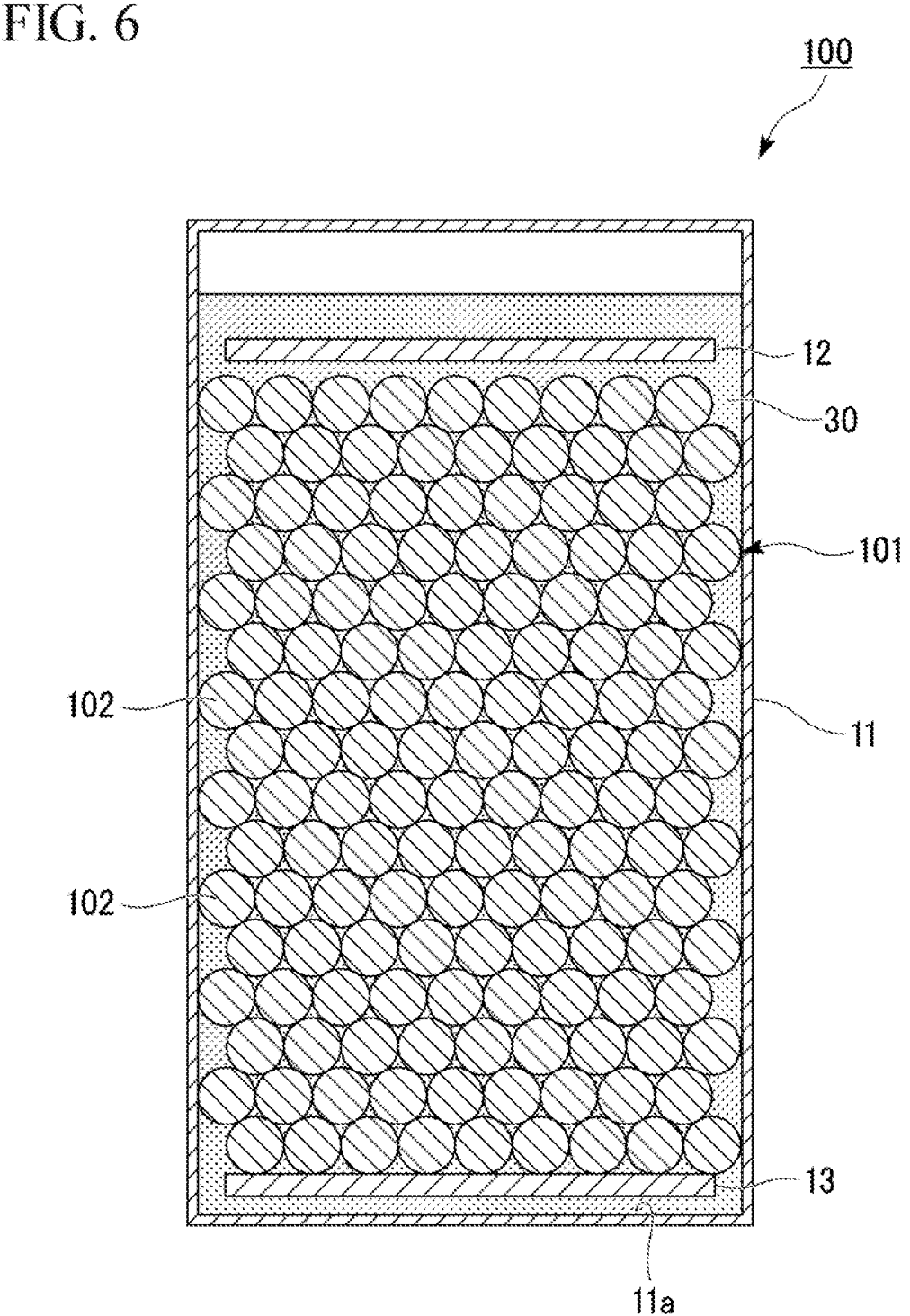
FIG. 6 is a schematic view showing a nanocarbon separation device of a second example embodiment.

FIG. 6 is a schematic view showing a nanocarbon separation device of the present example embodiment.

Here, in FIG. 6, components the same as those of the nanocarbon separation device of the first example embodiment shown in FIG. 1 will be denoted with the same reference numerals and redundant descriptions will be omitted.

A nanocarbon separation device 100 of the present example embodiment includes a separation tank (electrophoresis tank) 11, a first electrode 12 provided at an upper part in the separation tank 11, a second electrode 13 provided at a lower part in the separation tank 11, and a porous structure 101 that is provided between the first electrode 12 and the second electrode 13 in the separation tank 11 and extends in the height direction of the separation tank 11.

In the nanocarbon separation device 100 of the present example embodiment, the porous structure 101 is an aggregate of a plurality of particles 102.

The porous structure 101 is an aggregate of a plurality of particles 102 filled between the first electrode 12 and the second electrode 13 in the separation tank 11. The particles 102 are not particularly limited as long as they have a shape in which gaps are formed between the particles when they are closely filled into the separation tank 11. Examples of particles 102 include spherical particles, caltrop-shaped particles, and tetrapod (registered trademark) particles.

When such particles 102 are filled into the separation tank 11, gaps are formed between the particles 102 to form the porous structure 101. The gaps formed between the particles 102 correspond to a plurality of regions formed by partitioning the interior of the separation tank 11 by the porous structure 101.

The material of the particles 102 is not particularly limited as long as it is stable with respect to the nanocarbon dispersion liquid 30 and is an insulating material. Examples of materials of particles 102 include glass, quartz, and an acrylic resin.

The amount of particles 102 filled into the separation tank 11 is not particularly limited, and is appropriately set according to the amount (volume) of the nanocarbon dispersion liquid 30 accommodated in the separation tank 11.

The particles 102 may have a structure as long as nanocarbon micelles can pass therethrough, pores are continuously connected, and a potential gradient is formed between upper and lower electrodes. For example, when a spherical ceramic ball is used, the average particle diameter of the particles 102 is preferably 1 μm or more and 1 cm or less and more preferably 10 μm or more and 1 mm or less. When the average particle diameter of the particles 102 is 1 μm or more, since gaps to be described below are formed between the particles 102 filled into the separation tank 11, the porous structure 14 does not restrict movement of metallic nanocarbons and semiconducting nanocarbons contained in the nanocarbon dispersion liquid 30 in separation of the nanocarbon dispersion liquid 30 using the nanocarbon separation device 10. Thereby, metallic nanocarbons and semiconducting nanocarbons contained in the nanocarbon dispersion liquid 30 can be efficiently separated.

The porosity of the porous structure 101 is determined in the same manner as in the porosity of the porous structure 14 described above.

The size of the pores of the porous structure 101, that is, the size of the gap formed between the particles 102 is preferably 40 nm or more, more preferably 100 nm or more, and most preferably more than 200 nm. In addition, the inner diameter of the pores is preferably 1 cm or less and more preferably 1 mm or less.

When the inner diameter of the pores of the porous structure 101 is 40 nm or more, the porous structure 101 does not restrict movement of metallic nanocarbons and semiconducting nanocarbons contained in the nanocarbon dispersion liquid 30 in separation of the nanocarbon dispersion liquid 30 using the nanocarbon separation device 100. Thereby, metallic nanocarbons and semiconducting nanocarbons contained in the nanocarbon dispersion liquid 30 can be efficiently separated.

Here, the shape of the pores of the porous structure 101 is irregular and examples thereof include a spherical shape and a spheroidal shape. Therefore, the inner diameter of the pores of the porous structure 101 is the diameter of the sphere when the pores are spherical, the long diameter of the spheroid when the pores are spheroidal, and a length of the longest part of the shape when the pores have a shape other than a spherical shape or a spheroidal shape.

The size of the pore of the porous structure 101 is determined in the same manner as in the size of the pore of the porous structure 14 described above.

The porous structure 101, that is, the particles 102 constituting the porous structure 101, is preferably transparent, milky white translucent (white with a transparent back), or milky white (non-transparent white with a non-transparent back) in order to easily check a separation state between metallic nanocarbons and semiconducting nanocarbons contained in the nanocarbon dispersion liquid 30.

The nanocarbon separation device 100 of the present example embodiment may include an injection port (not shown) through which the nanocarbon dispersion liquid 30 is injected into the separation tank 11 as in the first example embodiment.

While a case in which the first electrode 12 is a negative electrode and the second electrode 13 is a positive electrode has been provided as an exemplary example of the nanocarbon separation device 100 of the present example embodiment, the nanocarbon separation device 100 of the present example embodiment is not limited thereto. In the nanocarbon separation device 100 of the present example embodiment, the first electrode 12 may be a positive electrode and the second electrode 13 may be a negative electrode.

According to the nanocarbon separation device 100 of the present example embodiment, when the porous structure 101 composed of the plurality of particles 102 filled into the separation tank 11 is provided between the first electrode 12 and the second electrode 13, for example, in a step of separating metallic nanocarbons and semiconducting nanocarbons contained in the nanocarbon dispersion liquid 30 which is performed in a nanocarbon separation method to be described below, the occurrence of a horizontal flow in the nanocarbon dispersion liquid 30 can be inhibited in the separation tank 11. Therefore, metallic nanocarbons and semiconducting nanocarbons can be quickly separated. Accordingly, it is possible to obtain highly pure metallic nanocarbons and semiconducting nanocarbons.

(Nanocarbon Separation Method)

A nanocarbon separation method using the nanocarbon separation device 100 will be described and also operations of the nanocarbon separation device 100 will be described with reference to FIG. 6.

As in the first example embodiment, the nanocarbon separation method of the present example embodiment includes a step of injecting the nanocarbon dispersion liquid 30 into the separation tank 11 (injection step) and a step of separating metallic nanocarbons and semiconducting nanocarbons contained in the nanocarbon dispersion liquid 30 by applying a direct current voltage to the first electrode 12 and the second electrode 13 (separation step).

In the injection step, when the nanocarbon dispersion liquid 30 is injected into the separation tank 11, the first electrode 12 and the second electrode 13 are brought into contact with the nanocarbon dispersion liquid 30. In the present example embodiment, the first electrode 12 and the second electrode 13 are immersed in the nanocarbon dispersion liquid 30.

The nanocarbon separation method of the present example embodiment is different from the nanocarbon separation method of the above first example embodiment in that a plurality of particles 102 are filled into the separation tank 11 to form the porous structure 101, and the interior of the separation tank 11 is partitioned into a plurality of regions. Thereby, in the present example embodiment, in the separation step, when the phase of the single-walled carbon nanotube dispersion liquid is separated in the separation tank 11 through electrophoresis, the occurrence of a horizontal flow in the single-walled carbon nanotube dispersion liquid can be inhibited. As a result, even if the separation tank 11 having a large inner diameter is used, the region A containing the dispersion liquid phase A is quickly formed in a region on the side of the first electrode 12 in the porous structure 101, and the region B containing the dispersion liquid phase B is formed in a region on the side of the second electrode 13 in the porous structure 14, and the phase of the single-walled carbon nanotube dispersion liquid can be separated into the dispersion liquid phase A and the dispersion liquid phase B.

According to the nanocarbon separation method using the nanocarbon separation device 100 of the present example embodiment, when the porous structure 101 formed of an aggregate of the plurality of particles 102 is provided between the first electrode 12 and the second electrode 13, the occurrence of a horizontal flow in the single-walled carbon nanotube dispersion liquid can be inhibited in the separation tank 11. As a result, it is possible to quickly separate metallic single-walled carbon nanotubes and semiconducting single-walled carbon nanotubes. Accordingly, it is possible to obtain highly pure metallic single-walled carbon nanotubes and semiconducting single-walled carbon nanotubes.

Here, while a case in which the mixture of single-walled carbon nanotubes is separated into metallic single-walled carbon nanotubes and semiconducting single-walled carbon nanotubes has been provided as an exemplary example of the nanocarbon separation method of the present example embodiment, the nanocarbon separation method of the present example embodiment is not limited thereto. In the nanocarbon separation method of the present example embodiment, for example, a single-walled carbon nanotube purifying method in which the mixture is separated into metallic single-walled carbon nanotubes and semiconducting single-walled carbon nanotubes in the separation tank 11, and only single-walled carbon nanotubes having desired properties are then recovered may be performed.

(Nanocarbon Recovery Method)

In the nanocarbon recovery method of the present example embodiment, after the separation operation according to the nanocarbon separation method using the nanocarbon separation device 100 of the present example embodiment is completed, the porous structure 101 is divided into the region A containing a large amount of metallic single-walled carbon nanotubes and the region B containing a large amount of semiconducting single-walled carbon nanotubes, metallic single-walled carbon nanotubes are recovered from the region A, and semiconducting single-walled carbon nanotubes are recovered from the region B.

The recovery method is not particularly limited, and any method in which the dispersion liquid phase A and the dispersion liquid phase B are not mixed by diffusion may be used.

In the nanocarbon recovery method of the present example embodiment, for example, the same method as in the first example embodiment is used as the recovery method.

In addition, as in the first example embodiment, the recovered dispersion liquid is accommodated again in the separation tank 11, and the operation of separating metallic single-walled carbon nanotubes and semiconducting single-walled carbon nanotubes contained in the single-walled carbon nanotube dispersion liquid through electrophoresis may be repeatedly performed.

The separation efficiency of the recovered dispersion liquid can be evaluated as in the first example embodiment.

According to the nanocarbon recovery method of the present example embodiment, after the separation operation according to the nanocarbon separation method of the present example embodiment is completed, metallic single-walled carbon nanotubes can be efficiently recovered from the region A of the porous structure 101 and semiconducting single-walled carbon nanotubes can be efficiently recovered from the region B of the porous structure 101.

[Third Example Embodiment] Electrode Particles
(Nanocarbon Separation Device)

Figure 7:
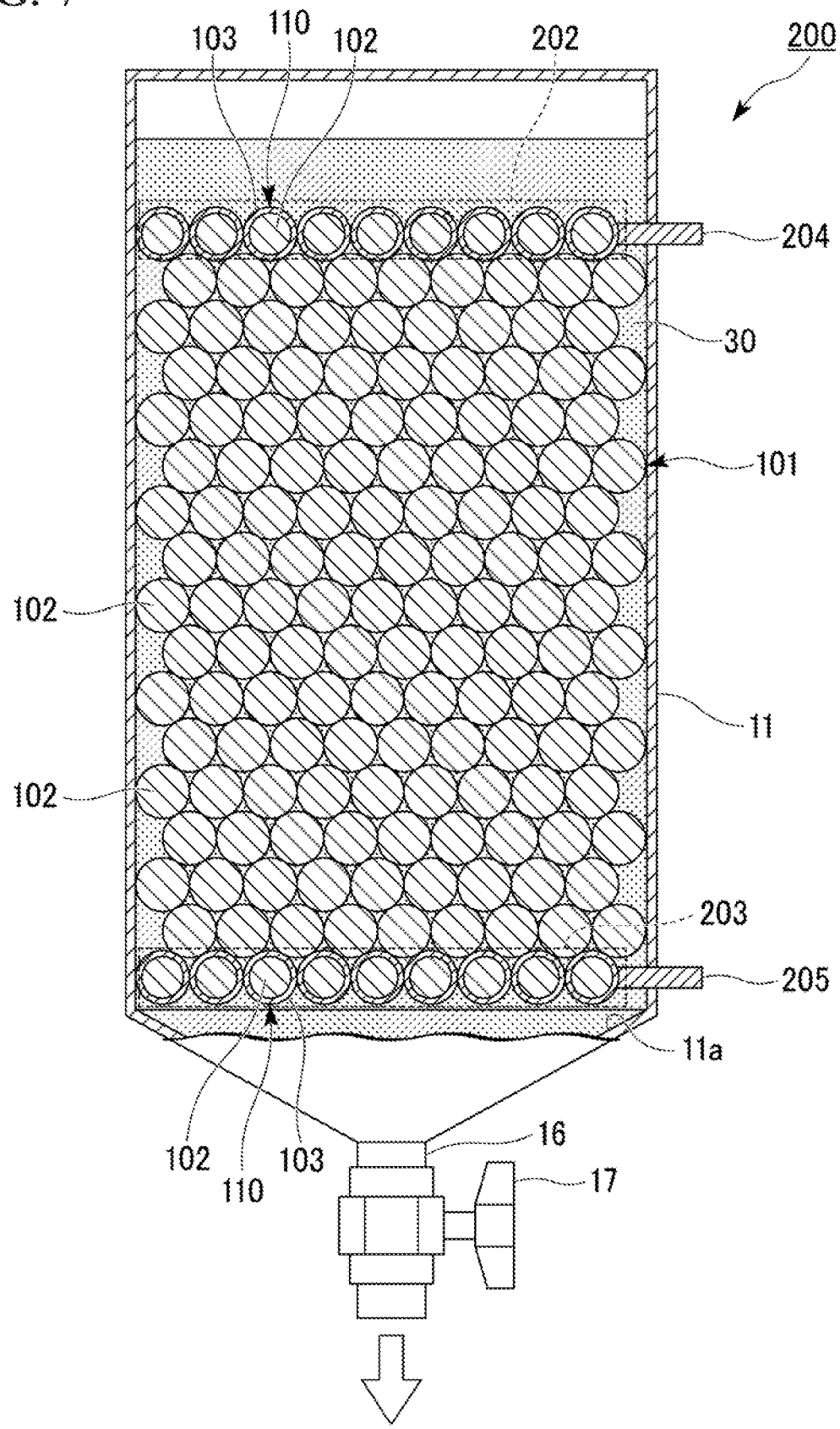
FIG. 7 is a schematic view showing a nanocarbon separation device of a third example embodiment.

FIG. 7 is a schematic view showing a nanocarbon separation device of the present example embodiment.

Here, in FIG. 7, components the same as those of the nanocarbon separation device of the first example embodiment shown in FIG. 1 and the nanocarbon separation device of the second example embodiment shown in FIG. 6 will be denoted with the same reference numerals and redundant descriptions will be omitted.

A nanocarbon separation device 200 of the present example embodiment includes a separation tank (electrophoresis tank) 11, a first electrode 202 provided at an upper part in the separation tank 11, a second electrode 203 provided at a lower part in the separation tank 11, and a porous structure 101 that is provided between the first electrode 202 and the second electrode 203 in the separation tank 11 and extends in the height direction of the separation tank 11.

The first electrode 202 includes particles 102 constituting the uppermost layer of the porous structure 101 and electrode particles 110 having a metal film 103 formed on the surface of the particles 102. The second electrode 203 includes particles 102 constituting the lowermost layer of the porous structure 101 and electrode particles 110 having a metal film 103 formed on the surface of the particles 102. The first electrode 202 and the second electrode 203 are arranged so that the plurality of electrode particles 110 are in contact with each other. Conductive wires 204 and 205 are connected to some of the electrode particles 110 constituting the first electrode 202 and the second electrode 203. The conductive wires 204 and 205 are drawn out of the separation tank 11. The metal film 103 is made of a metal such as platinum. A method of forming the metal film 103 is not particularly limited, and examples thereof include evaporation, electrolytic plating, and electroless plating.

The nanocarbon separation device 200 of the present example embodiment includes an injection/recovery port 16 that communicates with the inner bottom surface 11a of the separation tank 11 at the lower end of the separation tank 11. The injection/recovery port 16 is used for injecting the nanocarbon dispersion liquid 30 into the separation tank 11 and recovering the nanocarbon dispersion liquid 30 from the separation tank 11. In addition, the injection/recovery port 16 may have a closed structure such as a rotary cock 17 having a ground glass joint.

A part of the separation tank 11 that forms the inner bottom surface 11a and communicates with the injection/recovery port 16 has a tapered shape whose width (diameter) gradually decreases toward the injection/recovery port 16. Since the inner bottom surface 11a of the separation tank 11 has a tapered shape, the nanocarbon dispersion liquid 30 in the separation tank 11 can be recovered smoothly.

When the nanocarbon dispersion liquid 30 is gently injected and recovered using, for example, a peristaltic pump through the injection/recovery port 16 at the bottom of the separation tank 11, there is no need to move the injection/recovery port according to change in the liquid level during injection/recovery, and the injection/recovery operation can be performed without disturbing the liquid phase interface inside the separation tank 11. In addition, when the capacity of the separation tank 11 is increased, there is no need to prepare a long injection/recovery nozzle, which is very reasonable.

While a case in which the first electrode 202 is a negative electrode and the second electrode 203 is a positive electrode has been provided as an exemplary example of the nanocarbon separation device 200 of the present example embodiment, the nanocarbon separation device 200 of the present example embodiment is not limited thereto. In the nanocarbon separation device 200 of the present example embodiment, the first electrode 202 may be a positive electrode and the second electrode 203 may be a negative electrode.

According to the nanocarbon separation device 200 of the present example embodiment, since the first electrode 202 is composed of particles 102 constituting the uppermost layer of the porous structure 101 and electrode particles 110 having the metal film 103 formed on the surface of the particles 102, and the second electrode 203 is composed of particles 102 constituting the lowermost layer of the porous structure 101 and electrode particles 110 having the metal film 103 formed on the surface of the particles 102, there is no need to secure a space in which the first electrode 202 and the second electrode 203 are provided in the separation tank 11. In addition, according to the nanocarbon separation device 200 of the present example embodiment, since the second electrode 203 is composed of electrode particles 110, the porous structure 101 is composed of a plurality of particles 102 filled into the separation tank 11, and thus the particles 102 and the electrode particles 110 can freely move, when an injection/recovery port nozzle is inserted into the separation tank 11 via the injection/recovery port 16, the particles 102 and the electrode particles 110 do not obstruct the injection/recovery port nozzle. Therefore, the nanocarbon dispersion liquid 30 can be smoothly injected into and recovered from the separation tank 11 through the injection/recovery port 16. In addition, according to the nanocarbon separation device 200 of the present example embodiment, when the porous structure 101 composed of the plurality of particles 102 filled into the separation tank 11 is provided between the first electrode 202 and the second electrode 203, for example, in a step of separating metallic nanocarbons and semiconducting nanocarbons contained in the nanocarbon dispersion liquid 30 which is performed in a nanocarbon separation method to be described below, the occurrence of a horizontal flow in the nanocarbon dispersion liquid 30 can be inhibited in the separation tank 11. Therefore, metallic nanocarbons and semiconducting nanocarbons can be quickly separated. Accordingly, it is possible to obtain highly pure metallic nanocarbons and semiconducting nanocarbons.

(Nanocarbon Separation Method)

A nanocarbon separation method using a nanocarbon separation device 200 will be described and also operations of the nanocarbon separation device 200 will be described with reference to FIG. 7.

As in the first example embodiment, the nanocarbon separation method of the present example embodiment includes a step of injecting the nanocarbon dispersion liquid 30 into the separation tank 11 (injection step) and a step of separating metallic nanocarbons and semiconducting nanocarbons contained in the nanocarbon dispersion liquid 30 by applying a direct current voltage to the first electrode 202 and the second electrode 203 (separation step).

In the injection step, when the nanocarbon dispersion liquid 30 is injected into the separation tank 11, the first electrode 202 and the second electrode 203 are brought into contact with the nanocarbon dispersion liquid 30. In the present example embodiment, the first electrode 202 and the second electrode 203 are immersed in the nanocarbon dispersion liquid 30.

In the present example embodiment, a plurality of particles 102 are filled into the separation tank 11 to form the porous structure 101, and the interior of the separation tank 11 is partitioned into a plurality of regions. Thereby, in the separation step, when the phase of the single-walled carbon nanotube dispersion liquid is separated in the separation tank 11 through electrophoresis, the occurrence of a horizontal flow in the single-walled carbon nanotube dispersion liquid can be inhibited. As a result, even if the separation tank 11 having a large inner diameter is used, the region A containing the dispersion liquid phase A is quickly formed in a region on the side of the first electrode 202 in the porous structure 101 and the region B containing the dispersion liquid phase B is formed in a region on the side of the second electrode 203 in the porous structure 14, and the phase of the single-walled carbon nanotube dispersion liquid can be separated into the dispersion liquid phase A and the dispersion liquid phase B.

According to the nanocarbon separation method using the nanocarbon separation device 200 of the present example embodiment, when the porous structure 101 formed of an aggregate of the plurality of particles 102 is provided between the first electrode 202 and the second electrode 203, the occurrence of a horizontal flow in the single-walled carbon nanotube dispersion liquid can be inhibited in the separation tank 11. As a result, it is possible to quickly separate metallic single-walled carbon nanotubes and semiconducting single-walled carbon nanotubes. Accordingly, it is possible to obtain highly pure metallic single-walled carbon nanotubes and semiconducting single-walled carbon nanotubes.

Here, while a case in which the mixture of single-walled carbon nanotubes is separated into metallic single-walled carbon nanotubes and semiconducting single-walled carbon nanotubes has been provided as an exemplary example of the nanocarbon separation method of the present example embodiment, the nanocarbon separation method of the present example embodiment is not limited thereto. In the nanocarbon separation method of the present example embodiment, a single-walled carbon nanotube purifying method in which the mixture is separated into metallic single-walled carbon nanotubes and semiconducting single-walled carbon nanotubes in the separation tank 11, and only single-walled carbon nanotubes having desired properties are then recovered may be performed.

(Nanocarbon Recovery Method)

In the nanocarbon recovery method of the present example embodiment, after the separation operation according to the nanocarbon separation method using the nanocarbon separation device 200 of the present example embodiment is completed, the porous structure 101 is divided into the region A containing a large amount of metallic single-walled carbon nanotubes and the region B containing a large amount of semiconducting single-walled carbon nanotubes, metallic single-walled carbon nanotubes are recovered from the region A, and semiconducting single-walled carbon nanotubes are recovered from the region B.

The recovery method is not particularly limited, and any method in which the dispersion liquid phase A and the dispersion liquid phase B are not mixed by diffusion may be used.

In the nanocarbon recovery method of the present example embodiment, for example, the same method as in the first example embodiment is used as the recovery method.

In addition, as in the first example embodiment, the recovered dispersion liquid is accommodated again in the separation tank 11, and the operation of separating metallic single-walled carbon nanotubes and semiconducting single-walled carbon nanotubes contained in the single-walled carbon nanotube dispersion liquid through electrophoresis may be repeatedly performed.

The separation efficiency of the recovered dispersion liquid can be evaluated as in the first example embodiment.

According to the nanocarbon recovery method of the present example embodiment, after the separation operation according to the nanocarbon separation method of the present example embodiment is completed, metallic nanocarbons can be efficiently recovered from the region A of the porous structure 101 and semiconducting nanocarbons can be efficiently recovered from the region B of the porous structure 101.

[Fourth Example Embodiment]
(Nanocarbon Separation Method)

A nanocarbon separation method using the nanocarbon separation device 10 will be described with reference to FIG. 8.

First, water, a single-walled carbon nanotube dispersion liquid in which a mixture of single-walled carbon nanotubes is dispersed in an aqueous solution in which a non-ionic surfactant is dissolved, and an aqueous solution having a non-ionic surfactant amount of 2 wt % are prepared.

Next, for example, water is gently injected into the separation tank 11 from an injection/recovery port (not shown) provided at the lower end of the separation tank 11 using a peristaltic pump or the like.

Next, similarly, the single-walled carbon nanotube dispersion liquid is injected into the separation tank 11.

Next, similarly, the aqueous solution having a non-ionic surfactant amount of 2 wt % is injected into the separation tank 11.

Figure 8:
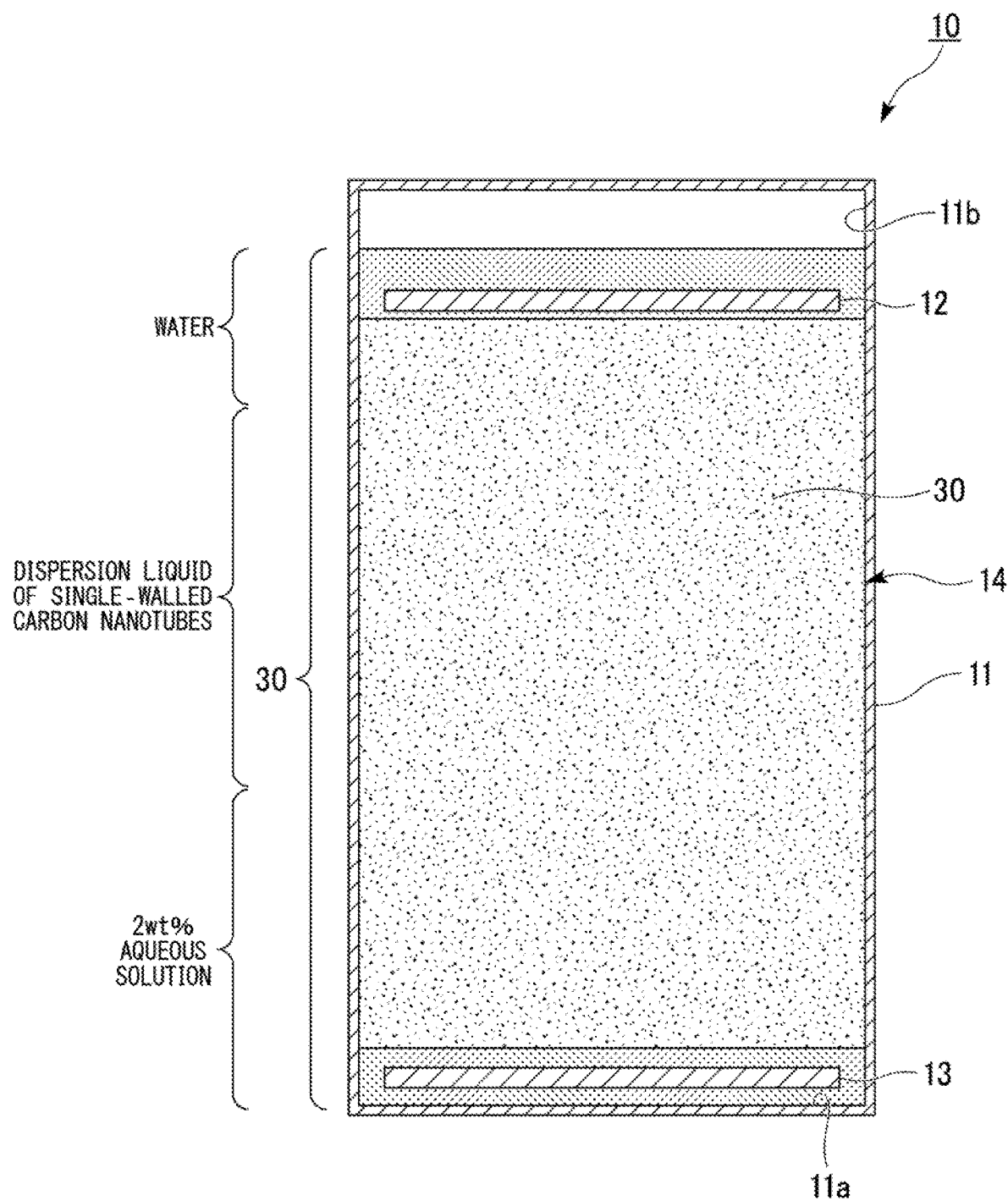
FIG. 8 is a perspective view showing a nanocarbon separation device of a fourth example embodiment.

Thereby, as shown in FIG. 8, a three-layer solution lamination structure in which a region in contact with the first electrode 12 is water, a region in contact with the second electrode 13 is a 2 wt % aqueous solution, and an intermediate region is the single-walled carbon nanotube dispersion liquid is formed.

In this case, the first electrode 12 is in contact with only water, and the second electrode 13 is in contact with only the 2 wt % aqueous solution. In addition, the first electrode 12 and the second electrode 13 are not in contact with the single-walled carbon nanotube dispersion liquid.

Hereinafter, as in the first example embodiment, the mixture of single-walled carbon nanotubes contained in the single-walled carbon nanotube dispersion liquid will be separated into metallic single-walled carbon nanotubes and semiconducting single-walled carbon nanotubes.

The nanocarbon separation method of the present example embodiment can be applied to the above first to third example embodiments.

While the example embodiment that can be applied when the mixture of single-walled carbon nanotubes is separated into metallic single-walled carbon nanotubes and semiconducting single-walled carbon nanotubes has been described above, the present invention can be applied also for separation of a mixture of multi-walled carbon nanotubes, a mixture of double-walled carbon nanotubes, a mixture of graphene, and the like.

INDUSTRIAL APPLICABILITY

According to the nanocarbon separation device of the present invention, in separation of a mixture of nanocarbons, it is possible to shorten a time required for the separation.

REFERENCE SYMBOLS 10, 100, 200 Nanocarbon separation device
11 Separation tank
12, 202 First electrode
13, 203 Second electrode
14, 101 Porous structure
30 Nanocarbon dispersion liquid
50 Cutting blade
102 Particle
103 Electrode particle
110 Electrode particle
204, 205 Conductive wire

The invention claimed is:

1. A nanocarbon separation device, comprising:
a separation tank which is configured to accommodate a dispersion liquid including a nanocarbon;
a first electrode that is provided at an upper part in the separation tank;
a second electrode that is provided at a lower part in the separation tank; and
a porous structure that is provided between the first electrode and the second electrode in the separation tank.

2. The nanocarbon separation device according to claim 1, wherein the porous structure comprises a sponge.

3. The nanocarbon separation device according to claim 1, wherein the porous structure is an aggregate of a plurality of particles.

4. The nanocarbon separation device according to claim 3, wherein the first electrode and the second electrode comprise the particles and electrode particles comprising a metal film formed on a surface of the particles.

5. A nanocarbon separation method using the nanocarbon separation device according to claim 1, the nanocarbon separation method comprising:
injecting a dispersion liquid including a nanocarbon into the separation tank; and
separating metallic nanocarbons and semiconducting nanocarbons included in the dispersion liquid by applying a direct current voltage to the first electrode and the second electrode.

6. The nanocarbon separation method according to claim 5,
wherein, in the injecting the dispersion liquid, in order from a lower part of the separation tank, a layer including an aqueous solution including a surfactant, a layer including the dispersion liquid, and a layer including water are formed, and the first electrode is brought into contact only with the layer including water and the second electrode is brought into contact only with the layer including the aqueous solution.

7. A nanocarbon recovery method using the nanocarbon separation device according to claim 1, the nanocarbon recovery method comprising
after the nanocarbon separation device completes a separation operation, dividing the porous structure into a region A including a large amount of metallic nanocarbons and a region B including a large amount of semiconducting nanocarbons, recovering the metallic nanocarbons from the region A, and recovering the semiconducting nanocarbons from the region B.

* * * * *